(12) United States Patent
Becker et al.

(10) Patent No.: US 6,913,183 B2
(45) Date of Patent: Jul. 5, 2005

(54) SELECTIVE GAS KNIFE FOR WAVE SOLDERING

(75) Inventors: Eric Wayne Becker, Lebanon, MO (US); Kenneth Kirby, Arlington, TX (US)

(73) Assignee: Speedline Technologies, Inc., Franklin, MA (US)

( * ) Notice: Subject to any disclaimer, the term of this patent is extended or adjusted under 35 U.S.C. 154(b) by 131 days.

(21) Appl. No.: 10/260,944

(22) Filed: Sep. 30, 2002

(65) Prior Publication Data

US 2004/0060960 A1 Apr. 1, 2004

(51) Int. Cl.[7] .............................. B23K 1/08; B23K 35/12
(52) U.S. Cl. .......................... 228/37; 228/8; 228/180.1; 228/260
(58) Field of Search .............................. 228/8, 19, 20.1, 228/37, 43, 180.1, 260

(56) References Cited

U.S. PATENT DOCUMENTS

| | | | |
|---|---|---|---|
| 4,410,126 A | * | 10/1983 | O'Rourke ................ 228/180.1 |
| 4,447,001 A | | 5/1984 | Allen et al. |
| 4,679,720 A | * | 7/1987 | Sedrick et al. ............. 228/20.1 |
| RE32,982 E | | 7/1989 | O'Rourke |
| 4,890,781 A | * | 1/1990 | Johnson et al. ................ 228/7 |
| 5,148,961 A | | 9/1992 | Humbert et al. |
| 5,228,614 A | | 7/1993 | Elliott et al. |
| 5,240,169 A | * | 8/1993 | Gileta ...................... 228/180.1 |
| 5,722,582 A | | 3/1998 | Gibson |
| 6,168,065 B1 | * | 1/2001 | Willemen ....................... 228/9 |

FOREIGN PATENT DOCUMENTS

DE    32 05 276 A1    10/1982

OTHER PUBLICATIONS

International Search Report mailed Jun. 7, 2003.

* cited by examiner

*Primary Examiner*—Lynne R. Edmondson
(74) *Attorney, Agent, or Firm*—Lowrie, Lando & Anastasi, LLP

(57) ABSTRACT

Selective gas knives for wave soldering provide for targeted gas flow at a particular location on a substrate, such as a printed circuit board. Both the temperature and flow rate of gas through a segment of a gas knife can be independently controlled.

10 Claims, 2 Drawing Sheets

SELECTIVE GAS KNIFE FOR WAVE SOLDERING

BACKGROUND

Printed circuit boards for electronics applications typically have leads to which electronic components, such as resistors, capacitors, integrated circuits, etc., are mounted to form a conductive coupling therebetween. The leads typically are in the form of conductive pads for surface-mount components and in the form of conductive through-holes for through-hole components.

The through-holes are in the form of orifices extending through the board; the internal walls that define the orifices are coated with an electrically conductive material. Pins on an electronic component are then inserted into the orifices and solder applied to physically bond the component to the board and to form a conductive link between the component and conductive pathways on the printed circuit board.

The solder is commonly applied in a molten form using a wave-soldering apparatus comprising a nozzle through which the molten solder is pumped. The molten solder flows out of the nozzle in the form of a wave, and a conveyor passes a printed circuit board across the molten-solder wave from an upstream side to a downstream side of the nozzle to allow the molten solder to contact the underside of the printed circuit board and to penetrate into the through-holes in the board. Further details of wave soldering apparatus are provided in U.S. Pat. Nos. 5,228,615 and 5,240,169, both of which are incorporated by reference herein in their entirety.

A hot-gas knife is positioned on the downstream side of the nozzle, relative to the path of the conveyor. A hot-gas knife is used to direct hot air against the underside of the printed circuit board to remove unwanted solder to prevent electrical shorting due to solder bridging (i.e., the formation of a conductive link due to misplaced solder) between conductive elements on the board.

SUMMARY

Existing hot-gas knives produce a substantially uniform stream of gas across the entire width of a process area on a printed circuit board. Accordingly, the entire board is "debridged" whether it needs it or not. Consequently, the knife is typically very energy inefficient.

In one embodiment, a selective gas knife described herein employs independent regulation of a plurality of gas channels to provide varying gas pressures and flow rates against different areas of a printed circuit board and therefore be used to debridge leads on selected areas of a printed circuit board with much greater efficiency. A regulator, e.g., a valve, and a heater are provided for each segment of the gas knife to independently control the temperature and flow rate of gas delivered through each segment.

In another embodiment, the gas knife is in the form of a single segment and is much narrower than a typical knife having a width that at least matches that of printed circuit boards that are being wave soldered so as to be able to direct gas flow across an entire surface of the boards This single-segment knife is designed to direct gas only against a limited portion of a printed circuit board. The single-segment knife is particularly suited for use with a selective wave soldering machine.

The knives of this disclosure provide the advantages of greater energy efficiency and enhanced flexibility and control, particularly in regard to debridging particular "problem areas" on a printed circuit board. In particular, gas flowing at higher rates can be specifically directed at an area of the board where pin separation distances may make the board particularly susceptible to solder bridging, and the temperature of the gas that impacts a specific locale on a printed circuit board can be increased in response to particular features on the board, such as a heat sink, to provide enhanced debridging of solder from the underside of the board.

Figure 1:
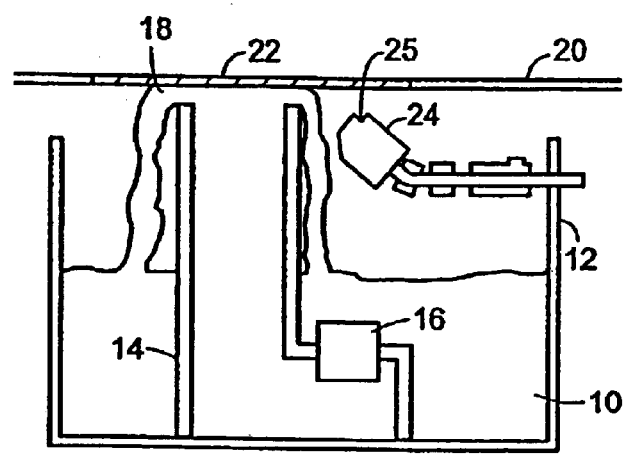
FIG. 1 is a partially schematic, sectional side view of a wave soldering apparatus including a gas knife.

The foregoing and other features and advantages of the apparatus will be apparent from the following, more-particular description. In the accompanying drawings, like reference characters refer to the same or similar parts throughout the different views. The drawings are not necessarily to scale, emphasis instead being placed upon illustrating particular principles, discussed below.

DETAILED DESCRIPTION

A wave soldering apparatus is illustrated in FIG. 1. Molten solder 10 is pooled in a container 12, and the molten solder 10 is drawn through a nozzle 14 via a pump 16 to produce a wave 18 of molten solder flowing from the nozzle 14. A conveyor 20 carries a printed circuit board 22 across the solder wave 18 (from left to right in FIG. 1) to deposit solder on the underside of the printed circuit board 22 and into through-holes in the board 22. After the board—now having had solder deposited on the underside of the board— is moved on conveyor 20 beyond the solder wave 18, a gas knife 24 directs a heated gas (e.g., air) against the underside of the board 22 to remove solder bridges therefrom.

The outlet orifice 25 of the knife 24 may be positioned at about the same level as the top of the nozzle 14. When the tops of the knife 24 and nozzle 14 are at the same height, with a wave height of 3.2 mm ($\frac{1}{8}^{th}$ inch), the printed circuit board 22 can be passed across the wave 1.6 mm ($\frac{1}{16}^{th}$ inch) above the nozzle 14 and knife 24.

The gas knife 24 is positioned sufficiently close to the nozzle 14 to impact the board 22 with gas before the solder starts to solidify but far enough away such that the gas does not disturb the solder wave 18. The gas emitted from the knife 24 should not disturb the wave 18 when a printed circuit board 22 is being soldered. When the outlet channel through the orifice of the knife 24 is set in a vertical position, the gas hits the board 22 and flows in all directions, including into the wave 18; the gas then may push the wave 18 off the upstream side of the nozzle 14, producing a bad joint. To compensate for this, the outlet channel of the knife 24 may be angled away from the nozzle 14 at an angle of 12° to 15° such that the gas would be directed slightly to the right of vertical in the perspective shown in FIG. 1. Angling the knife 24 substantially prevents the gas from impacting and pushing the wave 18 and still allows solder bridges on the printed circuit board 22 to be removed. The solder that is removed by the gas kinfe 24 will roll back down the face 42 of the knife 24 due to a small gas swirl created when the gas hits the board 22.

Figure 2:
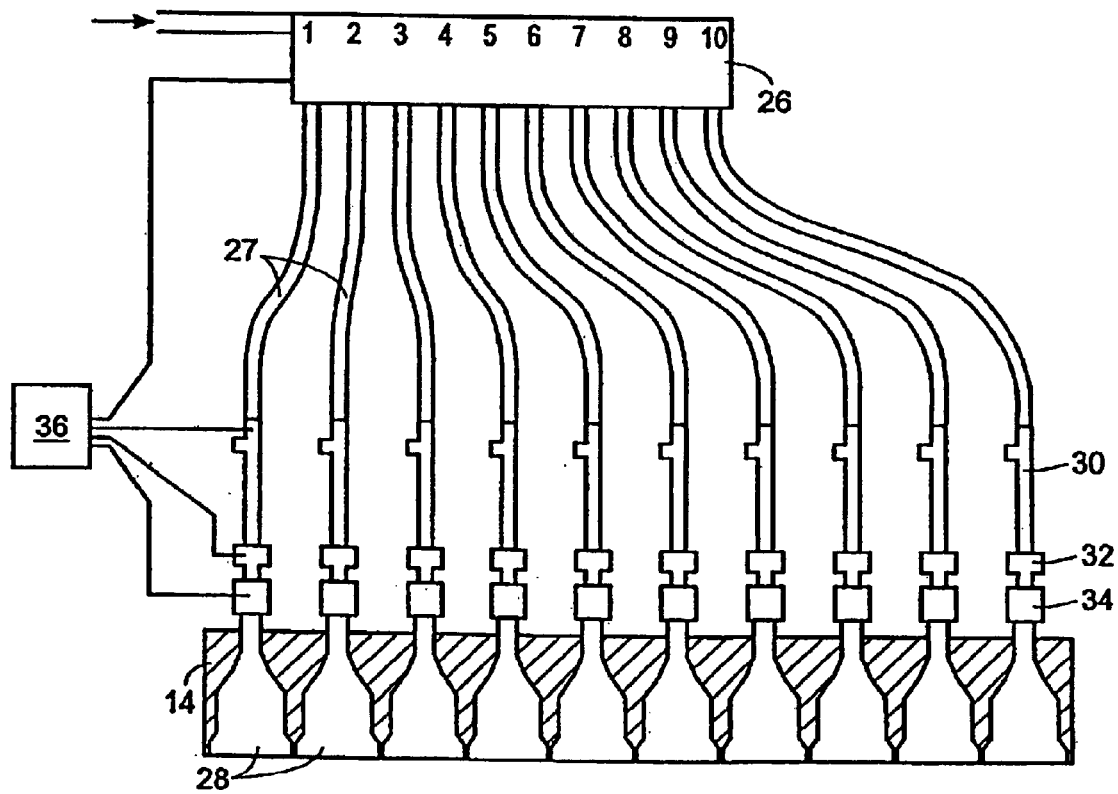
FIG. 2 is a top view of a selective gas knife assembly, with the knife sectioned to show the channels.

A selective gas knife assembly is illustrated in FIG. 2. An incoming air supply is fed into a solenoid bank 26 that selectively regulates the flow of gas through any or all of a plurality of conduits 27, each of which is coupled with a channel 28 in the gas knife 24'. An inline tube heater 30 is coupled with each conduit 27 for heating the gas flowing through the conduit 27. Downstream from the heater 30 is a thermocouple 32 and a pressure switch 34 that monitor temperature and pressure, respectively, to determine when a desired temperature and flow rate are established.

Each of these electronic elements is communicatively coupled with a computer controller 36. The controller 36 includes a processor for running software code and for receiving measurements from the thermocouple and pressure switch and for issuing control commands to the solenoid bank 26 and the inline heaters 30 based on instructions in the software code. The software code is stored on a computer-readable medium communicatively coupled with the processor. More specifically, the thermocouple 32 and pressure switch 34 generate readings that are communicated to the processor in the controller 36. The desired temperature and pressure/flow-rates in each conduit 27 are entered by an operator and stored in computer-readable memory. The software code directs the processor to compare the desired gas-flow parameters, as stored in the memory, with the readings obtained from the thermocouple 32 and pressure switch 34. The processor generates instructions to raise or lower both the temperature and pressure/flow-rate based on the above comparison. Those instructions are communicated to solenoid valves in the solenoid bank 26 to regulate gas-flow rate into each of the conduits 27 and to one or more of the inline heaters 30 to raise or lower the temperature of gas flowing from the conduits 27 through any or all of the channels 28 in the knife, if needed to reach the desired parameters.

Moreover, data (e.g., dimensions and locations of pin placements) for different types of printed circuit boards can be entered into computer-readable memory. When a board of a particular type is then carried through the solder wave, the controller will automatically control the temperature and/or gas flow rate through the different segments of the selective gas knife in response to the features of that board type.

Alternatively, the heater and manual valve associated with each segment of the knife for controlling temperature and flow rate therethrough can be manually adjusted without need for automated equipment.

In either case, the rate of gas flow through each segment of the knife can be set as a function of the gaps between through-hole pins in the board. Wider gaps between through-holes may require higher gas flow rates to debridge solder therebetween, though the question of whether greater or lesser rates of gas flow should be directed against a board with narrower or wider gaps between pins can be context specific. The temperature to which the gas is heated is a function of the distance between the nozzle and the board and also the nature of the board. If the board includes a component that serves as a heat sink, the temperature of the gas may need to be increased at that location.

With a 1.6 mm ($1/16^{th}$ inch) separation between the nozzle 14 and the printed circuit board 22, the heater 30, set at about 430° C. (800° F.), will produce air impacting the board at about 275° C. (525° F.). This temperature will generally be sufficient to ensure that the solder will not solidify when debridging occurs. To maintain this heat at a distance of about 6.4 mm (0.25 inches) separation between the nozzle 14 and the printed circuit board 22, the heater temperature should be about 650° C. (1200° F.).

Figure 3:
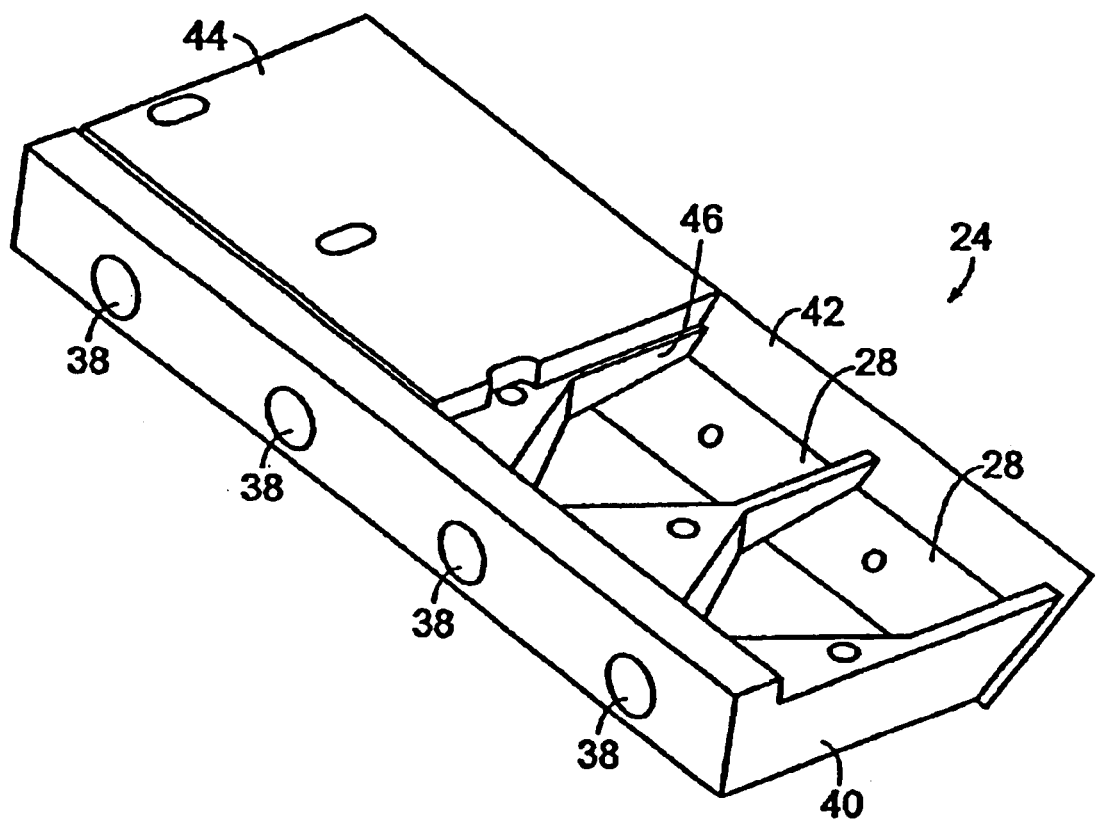
FIG. 3 is a perspective view of a selective gas knife with the top partially removed.

The selective gas knife 24' illustrated in FIG. 3 includes a plurality of segments 38, each defining a separate channel 28 through which heated gas is pumped. Each segment 38 is associated with its own pressure regulator, heater 30 and mechanism 32, 34 for providing feedback to a controller 36 (see FIG. 2). The body 40 of the knife 24' is a solid block formed, e.g., of stainless steel, with channels 28 cut in to generate an even, flat stream of gas. The face 42 of the knife 24' is a flat plate that deflects the gas to an orifice. The width of the channels 28 in one embodiment is about 5 cm (2 inches) at the exit orifice. In the aggregate, the plurality of channels 28 can direct gas streams across the entire width of a printed circuit board.

The top 44 of the knife 24' is mated to the body 40 and can be slid on the body 40 to achieve different gaps between it and the face 42 where they define the exit orifice of the segment 38. The gap can range from about 0.25 to about 3.2 mm (0.010 to 0.125 inches). A gap of desired width can be selected based on the application. A smaller gap will reduce the gas volume and narrow the spray pattern, while a larger gap will produce a gentler impact against the printed circuit board.

The dividers 46 between the channels 28 can be tapered so that they narrow to a point at their ends where the gas exits the segment 38. This tapering allows the gas flow across segments 38 to be substantially seamless (i.e., without dead-spots downstream from the dividers 46).

Figure 4:
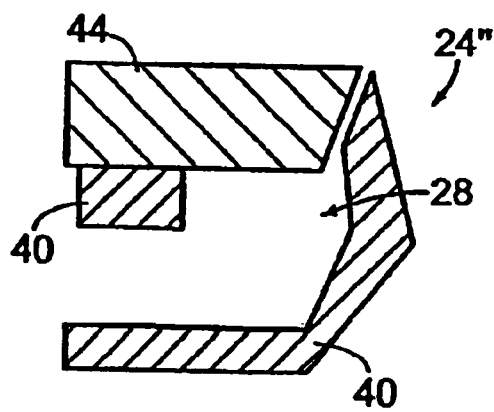
FIG. 4 is a cross-sectional view of a single-section gas knife.

In another embodiment (illustrated in FIG. 4), a single-segment gas knife 24" that does not offer selective control over different channels can be used to direct gas only against selected areas of the printed circuit board. In this embodiment, the gas knife 24" is used with a selective wave soldering machine, which includes one or more nozzles for applying solder only to desired local areas of the printed circuit board and to not affect adjacent areas. In this apparatus, both the nozzle and the knife are displaceable. The conveyor in a selective wave soldering apparatus is generally horizontal over the nozzle, whereas conveyors used in other wave soldering apparatus often travel at a slight incline. Selective wave soldering is particularly suitable where through-holes are located only in a particular region of the board or wherever there is only a particular regional need for deposition of the solder. Selective wave soldering can also be advantageously used on an area of a board that is highly populated with connectors or solder even just a single connector that is surrounded by electronic components.

The single-segment gas knife 24" is the same as the segmented knife 24' described above, except the former has only one segment 38 and is very small. That segment can be, for example, about 2.5 cm (one inch) or less in width (width being measured along the long axis of the knife's output orifice). In a particular embodiment the knife 24" is about 1.3 cm (½ inch wide). In any case the width of the knife will be considerably smaller than the width of a printed circuit board against which the gas is directed. The gas knife 24" can be designed with just two main parts, the body 40 and the top 44. The gap between the body 40 and the top 44 where the gas exits can again be set at about 0.25 to about 3.2 mm (0.010 to 0.125 inches). The flow characteristics through the channel 28 are essentially the same as those through the channels 28 of the segmented knife 24', described above.

The segments of the two types of knives 24' and 24" operate similarly. A solenoid, pressure regulator, heater, thermocouple, and pressure switch control each segment. If a knife has ten segments, each segment will have one of each of the above components. Accordingly, the temperature and pressure in each segment can be different the temperature and pressure in the other segments. The temperature is determined by the output of the heater and the flow rate through the heater.

While this invention has been shown and described with references to particular embodiments thereof, those skilled in the art will understand that various changes in form and details may be made therein without departing from the scope of the invention, which is limited only by the following claims.

What is claimed is:

1. A wave soldering apparatus comprising:
   a container for containing molten solder;
   a nozzle having an inlet positioned to withdraw molten solder from the container and an outlet through which the molten solder can flow out of the nozzle in the form of a wave;
   a pump positioned to pump molten solder from the container through the nozzle;
   a conveyor for passing a substrate across a molten solder wave flowing from the nozzle to deposit molten solder on the substrate; and
   a selective gas knife positioned to impinge a gas on the substrate after the substrate passes across the molten solder wave, wherein the selective gas knife;
      includes a plurality of segments, each defining one or more channels for delivering a gas through the selective gas knife; and
      includes a regulator to independently govern the flow of gas through each of the segments.

2. The wave soldering apparatus of claim 1, wherein each segment of the gas knife includes a heater.

3. The wave soldering apparatus of claim 1, wherein a differential pressure gauge and a temperature gauge are coupled with each segment of the knife to monitor the temperature and flow rate of gas flowing through the segment.

4. The wave soldering apparatus of claim 3, wherein each segment of the gas knife includes a feedback mechanism to communicate with a controller.

5. The wave soldering apparatus of claim 1, wherein the segments of the gas knife are separated by dividers that have an end proximate an output orifice of the knife that is tapered.

6. A method for wave soldering comprising:
   pumping molten solder through a nozzle to form a wave of molten solder flowing from the nozzle;
   passing a printed circuit board across the wave of molten solder to deposit molten solder from the wave onto the printed circuit board; and then
   directing gas from a plurality of channels in a gas knife against the printed circuit board to remove unwanted molten solder from the printed circuit board, wherein a regulator is used to independently regulate the flow of gas through the channels in the gas knife to generate varying levels of gas flow against different parts of the printed circuit board.

7. The method of claim 6, wherein the rate of gas flow passing through a channel in the knife that is aligned with a concentration of through-holes in a printed circuit board is increased above the rate of gas flow through other channels.

8. The method of claim 6, further comprising independently regulating the temperature of gas flowing through a channel in the gas knife.

9. The method of claim 8, wherein the temperature of gas flowing through a channel in the knife that is aligned with a heat sink on a printed circuit board is increased above the temperature of gas flowing through other channels.

10. A selective wave soldering apparatus comprising:
    a container for containing molten solder;
    at least one selective wave soldering nozzle having an inlet positioned to withdraw molten solder from the container and an outlet through which the molten solder can flow out of the nozzle in the form of a wave;
    a pump positioned to pump molten solder from the container through the nozzle;
    a conveyor for passing a substrate across a molten solder wave flowing from the nozzle to deposit molten solder on the substrate; and
    a displaceable gas knife positionable to impinge a gas on a portion of the substrate after the substrate passes across the molten solder wave, the displaceable gas knife having a width of about one inch or less.

* * * * *